Sept. 17, 1940.    H. J. RADLE    2,215,438
BATTERY GRID PASTING MACHINE
Filed April 3, 1935    4 Sheets-Sheet 1

Sept. 17, 1940.    H. J. RADLE    2,215,438
BATTERY GRID PASTING MACHINE
Filed April 3, 1935    4 Sheets-Sheet 4

Inventor;
Henry J. Radle
BY
Wm. O. Belt
Attorney.

Patented Sept. 17, 1940

2,215,438

UNITED STATES PATENT OFFICE 2,215,438

BATTERY GRID PASTING MACHINE

Henry J. Radle, Evanston, Ill., assignor, by mesne assignments, to USL Battery Corporation, Niagara Falls, N. Y., a corporation of New York Application April 3, 1935, Serial No. 14,475

10 Claims. (Cl. 226—39)

This invention relates to machines for applying paste to the grids used in storage batteries. The grids usually consist of a frame across which spaced bars extend in intersecting relation whereby a multiplicity of openings are formed into which a paste is packed to provide a facing of paste on each side of each grid.

The paste is of a more or less poisonous nature and for this reason hand application of the paste to the grids or pasting is undesirable. Moreover, hand pasting is slow and ununiform. Machines have been proposed for applying paste to storage battery grids but such machines have not pasted grids satisfactorily and the majority of battery manufacturers resort to hand pasting. It is the purpose of this invention to automatically paste grids and avoid the difficulties heretofore encountered in grid pasting machines.

The principal object of the invention is to apply paste to storage battery grids automatically so that all of the openings in each grid will be uniformly, completely and compactly filled to provide properly pasted grids having full surfaces of paste on the sides thereof.

Another object is to roughen the surfaces of pasted grids and thereby increase the surface area.

A further object is to render the grids durable and prevent checking thereof by passing them through a fixing bath.

Still further objects of the invention are to automatically feed grids sequentially to pasting position; to force paste toward and to fill the openings in the grids while they are in pasting position; to strip the paste from the pressing means and separate the pasted grids from the filling means; to remove excess paste from the pasted grids prior to passage thereof from pasting position to avoid waste of the paste; to smooth the pasted grids and insure uniformity therein; and to tightly pack the paste onto the grids and thereby completely fill the openings therein.

Further objects are to sequentially advance grids through the machine and to prevent adherence of the paste to the advancing means as the grids pass from association therewith and thereby avoid pulling the paste from the grids, and objects ancillary to the foregoing are to provide a novel belt for advancing the grids and to maintain a predetermined condition in the belt.

Still further objects are to remove paste from operative parts of the machine and to collect the removed paste in the machine; to remove paste from the edges of the pasted grids during passage thereof through the machine and to collect the removed paste in the machine; to prevent the application of paste to selected parts of the grids; to pack the pasted grids together to facilitate removal thereof from the machine; and to provide a novel machine of simple and economical construction and efficient and positive operation.

In the selected embodiments of my invention illustrated in the accompanying drawings.

In the drawings, the machine includes a frame 10 having side plates 11 at one end thereof, the upper edges of which side plates are inclined inwardly as indicated at 12 (Fig. 1) and the flanges 13 at the lower end of a hopper 14 are spaced from these tapered top edges by spacing bolts 15''. The hopper is held in place on the side plates by bolts 15 extending through the flanges 13 and threadedly engaging the side plates. The bolts have springs 15' between their heads and the flanges 13 so that the hopper will be normally spring pressed toward the side plates at all times.

The top edges of extensions 16 of the side plates provide a table on which a stack of grids G are mounted to be withdrawn one at a time.

The grids pasted by this machine comprise a substantially rectangular frame having bars therein arranged in intersecting relation to provide a multiplicity of openings and at one upper corner of each grid there is a lug L. Two of such grids are arranged in side by side relation and are suitably joined along the juxtaposed edges so that there is a lug L at each of the upper corners of such a pair of grids. Grids as used hereinafter refers to a pair so that there is a lug L at the upper corners thereof, and these lugs are utilized in the passage of the grids through this machine, as will be explained hereinafter.

A shaft 17 is journaled in the extensions 16 and carries a feed roller 18 having a relieved portion 19 in the periphery thereof defining a shoulder 20. A ledge 21 extends between the extension 16 near the juncture thereof with the side plates 11 and provides a support for the stack of grids. A shaft 22 extends between the extensions 16 substantially midway between the roller 18 and the ledge 21 and a roller 23 thereon also supports the stack of grids particularly when the lowermost grid in the stack is fed forwardly.

Figures 3, 4:
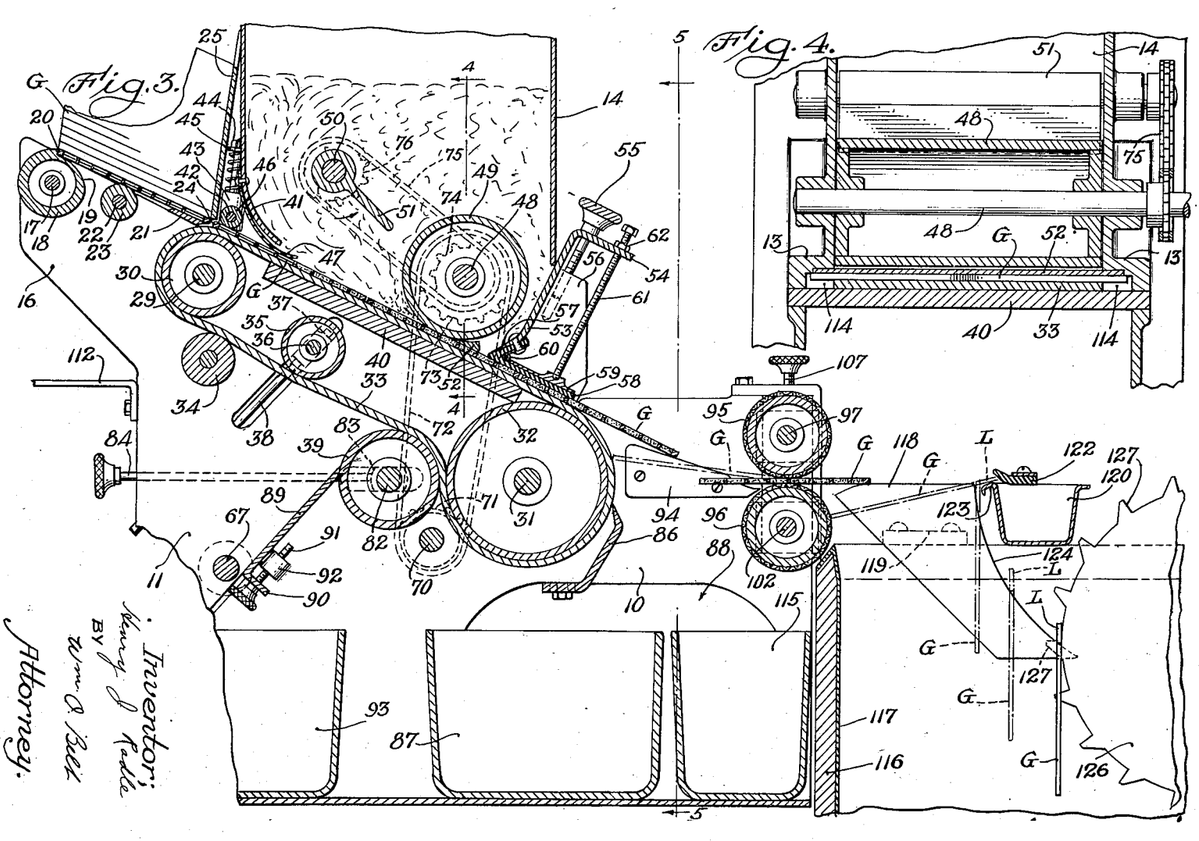
Fig. 3 is a longitudinal sectional view taken substantially on the line 3—3 of Fig. 2.
Fig. 4 is a vertical transverse sectional view taken substantially on the line 4—4 on Fig. 3.

In a manner to be described hereinafter, rotative movement in a clockwise direction, as viewed in Fig. 3, is imparted to the feed roller 18 in timed relation with the operation of other parts of the machine and thereby the shoulder 20 is brought into engagement with the lowermost grid in the stack of grids on the top edges of the extensions 16, and the engagement of this shoulder with the lowermost grid causes this grid to be fed forwardly over the roller 23 and ledge 21 and through the opening 24 defined by spacing the lower edge of the wall 25 from the top edges of the extensions 16.

The wall 25 includes inturned ears 26 (Fig. 1) through which adjustment bolts 27 are passed, and these bolts are secured in flanges 28 on the sides of the hopper 14. Springs 29 are disposed about the bolts 27 between the ears 26 and the flanges 28 and urge the wall 25 upwardly so that by adjusting the bolts 27 the vertical extent of the opening 24 may be regulated to accommodate grids of varied thicknesses. The grids stacked upon the top edges of the extensions 16 rest against the wall 25 and gravitate theretoward by reason of the inclination of the top edges of the extensions.

A shaft 29 is journaled in the side walls 11 in substantially vertical alignment with the lower end of the wall 25 and an elongated pulley 30 is mounted thereon. Another shaft 31 is journaled in the side walls 11 in substantially vertical alignment with the forward end of the hopper 14 and an elongated pulley 32 is mounted thereon. An endless belt 33 is passed about the pulleys 30 and 32 and preferably this belt is made of a heavy fabric material. A roller 34 is supported adjacent the roller 30 on a shaft journaled in the side plates 11 and is positioned outwardly of the endless belt. Another roller 35 is mounted inwardly of the endless belt 33 adjacent the roller 34 and this roller is mounted on a shaft 36 journaled in nuts 37 through which adjustment bolts 38 are passed, and this arrangement affords a belt tightener. By rotating the bolts 38 the nuts 37 may be moved therealong to draw the belt 33 toward the roller 34. The endless belt 33 also passes over a roller 39 mounted adjacent the pulley 32 for a purpose to be described more fully hereinafter.

A bed plate 40 extends between the side plates 11 immediately below the upper reach of the belt 33 between the pulleys 30 and 32 and this reach of the belt provides the bottom of the hopper 14. The rear wall of the hopper 14 is flared inwardly as at 41 and terminates in spaced relation with the reach of the belt providing the bottom of the hopper.

In the space between the inwardly flared part 41 of the hopper and the wall 25 there is a shaft 42, the ends of which are journaled in bearings 43 that are mounted for vertical movement on bolts 44 fastened in the side plates 11. Springs 45 about these bolts act on the top edges of the bearings 43 and urge the roller 46 mounted on the shaft 42 between the bearings 43 toward the belt 33.

The shoulder 20 remains in engagement with the rear edge of the lowermost grid until the leading edge of this grid has passed through the opening 24 into position below the roller 46 which thereupon clamps the grid in advancing engagement with the belt 33 and thereupon the belt feeds the grid through the bottom of the hopper 14. A leaf spring 47 carried by the inwardly flared part 41 of the rear wall of the hopper bears upon the grid at the bottom of the hopper and forces the grid into engagement with the belt 33 to insure the advancing of the grid through the hopper which is pasting position in the machine.

A shaft 48 is journaled in the side walls of the hopper 14 and carries a roller 49, the lower part of the periphery of which is sufficiently spaced from the upper reach of the belt 33 to permit the grid on the belt at the bottom of the hopper to pass through the bight between this roller and the belt. Another shaft 50 is journaled in the side walls of the hopper 14 and carries an agitator 51. The shafts 48 and 50 are driven in a manner to be described hereinafter.

The paste that is to be packed onto the grids is introduced into the hopper 14 and the agitator 51 is operated in the direction of the arrow (Fig. 3) to force this paste toward the grid at the bottom of the hopper. As the grids pass through the hopper the roller 49 feeds the paste into the openings in the grids and paste is thereby applied to both sides of the grids. The belt 33 backs up the grids as the paste is fed thereinto and insures filling of the openings in the grids.

The paste may adhere to the periphery of the roller 49 and this would tend to pull the paste off the grids and to prevent this a blade 52 is mounted in the hopper 14 and engages the periphery of the roller 49 immediately forward of the bight thereof. This blade so scrapes the periphery of the roller 49 that the paste is stripped therefrom and as the grids pass beneath the blade the paste is packed thereonto.

Figure 5:
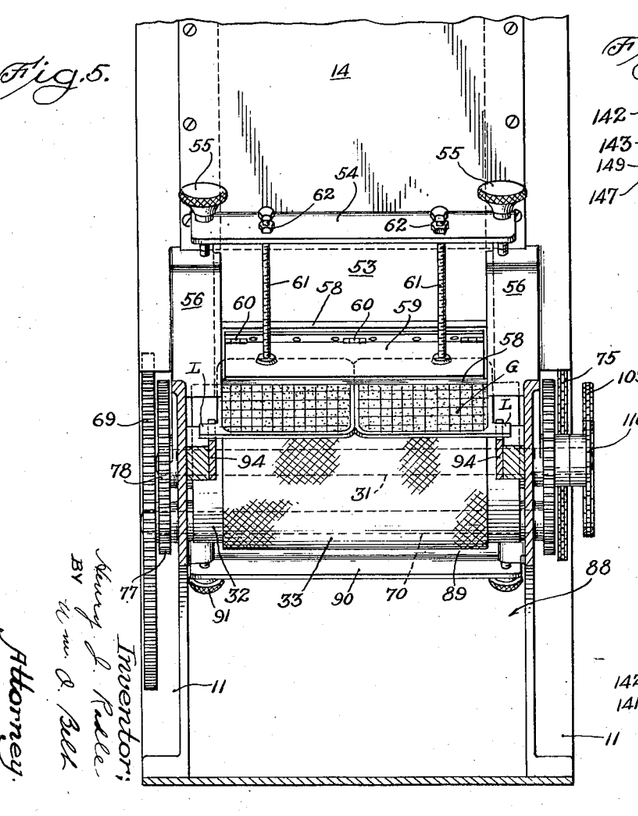
Fig. 5 is a vertical transverse sectional view taken substantially on the line 5—5 on Fig. 3.
Figure 6:
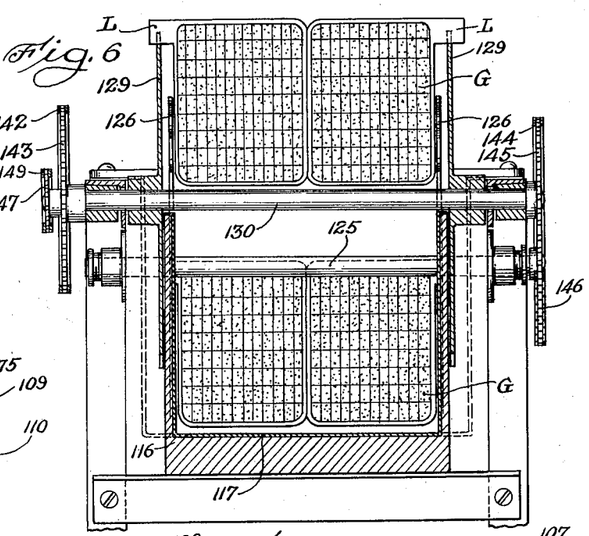
Fig. 6 is a vertical transverse sectional view taken substantially on the line 6—6 on Fig. 1.

The front wall of the hopper 14 is terminated in an appreciable amount above the belt 33 and another wall 53 (Figs. 3 and 5) extends from the lower end of the front wall of the hopper almost to the belt 33. This wall 53 is preferably inclined inwardly and a flange 54 is provided at the upper end thereof. Adjusting bolts 55 pass through the flange 54 near the ends thereof and are secured in flanges 56 at the sides of the hopper. An inwardly inclined foot 57 at the lower end of the wall 53 engages an upwardly extending flange on the mat 58. The mat 58 is preferably made of rubber or similar material. The plate 59 and the flange thereon provide a backing for the mat 58 and the flange is connected to the plate by a hinge 60.

By adjusting the bolts 55 the foot 57 may be moved toward and away from the belt 33 to regulate the engagement of the leading edge of the mat 58 with the grids after passage thereof beneath the blade 52. The leading edge of the mat is adapted to wipe the pasted grids to remove excess paste therefrom prior to passage thereof from the hopper and preferably the wiping engagement is such that all but a thin film of the paste is removed from the face of the grids.

The other end of the mat 58 is adjustable independently of that part thereof below the foot 57 and this part of the mat forcibly presses the paste into the openings in the grids so that after the pasted grids move from below this part of the mat the surface of the paste packed into the openings therein is flush with the faces of the frames of the grids. This part of the mat is adjusted to apply this pressure by means of adjusting bolts 61 which extend through the flange 54 and engage in bosses on the upper surface of the backing plate 59. These bolts 61 are held in adjusted positions by lock nuts 62 thereon which cooperate with the flange 54. It will thus be seen that the portion of the mat 58 adjacent the upwardly extending flange thereon is adjustable independently of the other part thereof that extends substantially parallel with the belt 33 and therefore this mat will wipe the excess paste from the pasted grids and forcibly press the paste into the openings in the grids.

A chain 63 is passed about a sprocket 64 on the shaft of the motor 65 carried by the frame 10 and this chain also passes about a sprocket 66 fast on the shaft 67 journaled in the side plates 11. A pinion 68 fast on the shaft 67 outwardly of one of the side plates 11 meshes with a gear 69 fast on a shaft 70 journaled in the side plates 11. A sprocket 71 is fast on the shaft 70 ouwardly of the other side plate 11 and a chain 72 is passed thereabout and about a sprocket 73 fast on the shaft 48. Another sprocket 74 is fast on the shaft 48 adjacent the sprocket 73 and a chain 75 is passed thereabout and about a sprocket 76 fast on the shaft 50. A pinion 77 (Fig. 5) is fast on the shaft 70 inwardly of the gear 69 and meshes with a gear 78 fast on the shaft 31. Inasmuch as the belt 33 interconnects the pulleys on the shafts 29 and 31 rotation imparted to the shaft 31 is transmitted to the shaft 29. A chain 79 is directed about the sprocket 80 fast on the shaft 29 outwardly of one of the side plates 11 and this chain is directed about another sprocket 81 on the shaft 17.

Upon operation of the motor 65 the chain 63 drives the sprocket 66 and the shaft 67 and thereupon pinion 68 drives the gear 69 to rotate the shaft 70. Upon rotation of the shaft 70 the pinion 77 drives the gear 78 and rotates the shaft 31 whereupon the belt 33 is driven, and this causes rotation of the shaft 29 and therefore the sprocket 80 and hence the chain 79 transmits rotation to the sprocket 81 whereupon the shaft 17 is driven to cause rotation of the roller 18. It will therefore be apparent that the roller 18 is driven in timed relation with the operation of the belt 33 to insure proper feeding of the grids through the hopper 14. Furthermore, rotation of the shaft 70 rotates the sprocket 71 to drive the chain 72 whereupon the shaft 48 is rotated to drive the roller 49 and rotation of the shaft 48 is transmitted through the sprocket 74, chain 75 and sprocket 76 to rotate the shaft 50 and operate the agitator 51.

The paste introduced into the hopper 14 is rather moist and the pressure exerted by the roller 49 and the mat 58 squeezes moisture from the paste into the belt 33. I have found, however, that if the belt 33 is highly saturated with moisture the paste in the openings in the grids will tend to stick thereto and if the paste sticks to the belt it will be pulled from the openings when the grids pass from engagement with the belt. I have also found that the paste sticks to the belt if the belt is too dry and therefore the belt is moistened prior to each time the machine is set in operation. In the operation of the machine the belt is properly conditioned by maintaining a predetermined degree of saturation in the belt. Thus moisture squeezed from the paste is extracted from the belt so as to maintain the predetermined degree of saturation therein. To this end the roller 39 is provided and the roller is positioned adjacent the pulley 32 so that the belt passes between the peripheries of this roller and pulley to be subjected to pressure so that any excess moisture will be squeezed from the belt.

In the operation of the machine the amount of moisture squeezed from the paste by the roller 49 and the mat 58 and the humidity of the atmosphere will vary as well as other variables and therefore the belt should be subjected to variated pressures so that the predetermined degree of saturation may be maintained therein under all conditions and this degree of saturation is determined by so adjusting the roller 39 relative to the periphery of the pulley 32 that there will be sufficient moisture in the belt to prevent sticking of the paste thereto. Thus if in the operation of the machine, paste sticks to the belt the operator may adjust the roller 39 to vary the pressure impressed upon the belt 33 to thereby adjust the moisture content of the belt to insure passage of the grids through the machine without the paste sticking to the belt. Therefore, to permit adjustment of the roller 39, the shaft 82 on which it is mounted is journaled in bearings 83 mounted on adjustment screws 84 journaled in lugs 85 (Fig. 1) on the side plates 11. The adjustment screws 84 extend beyond the outer edges of the side plates 11 and are therefore accessible to facilitate adjustment of the roller 39.

Even when the predetermined degree of saturation is maintained in the belt 33 some paste may collect thereon and the proper degree of saturation is maintained to prevent the paste being pulled from the openings in the grids. However, the paste which does collect on the periphery of the belt is scraped therefrom by a scraper 86 (Fig. 3) which engages the belt near the point of disengagement thereof from the grids. The scraper 86 includes an inwardly inclined upper edge so that paste scraped from the belt will pass into a receptacle 87 mounted in the frame 10 below the scraper 86, openings 88 being provided in the side plates 11 to permit removal of the receptacle 87 from time to time so that paste collected therein may be dumped therefrom. The paste packed into the grids by this machine has greater affinity for metal than for a fabric such as that of which the belt 33 is made and therefore any paste not removed from the belt 33 by the scraper 36 will adhere to the periphery of the metallic roller 39 when the belt passes into contact therewith, and in the normal operation of the machine but a very small amount of paste will be collected on the roller 39. However, any paste which is collected thereon will be scraped therefrom by a blade 89 including a depending flange 90 through which adjustment bolts 91 are passed that are mounted in lugs 92 on the inner sides of the side plates 11. Any paste scraped from the roller 39 by the blade 89 will pass into a receptacle 93 mounted in the frame 10 adjacent the receptacle 87.

If two grids are inadvertently fed into the bottom of the hopper by the feeding means or if any foreign matter is present in the paste which would normally jam the belt 33 and pasting roller 49, the springs 15' will permit the hopper to raise to permit the extra grid or foreign matter to pass between the pasting roller and belt and out of the hopper without damage to any part thereof.

Figure 7:
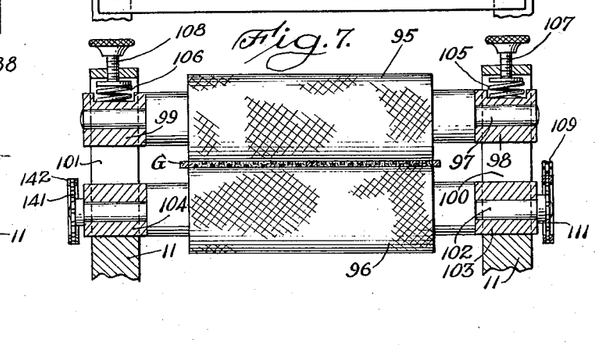
Fig. 7 is a vertical transverse sectional view taken substantially on the line 7—7 on Fig. 1.

When the pasted grids pass from engagement with the belt 33 the leading ends thereof are supported by the engagement of the lugs L with cam plates 94 mounted on the inner sides of the side plates 11 forwardly of the pulley 32. The cam plates 94 lead to the bight between rollers 95 and 96. The roller 95 is mounted on a shaft 97 (Fig. 7) journaled in bearing blocks 98 and 99 respectively mounted in the slots 100 and 101 in the side plates 11. The roller 96 is mounted on a shaft 102 journaled in bearing blocks 103 and 104 that are also respectively mounted in the slots 100 and 101. The bearing blocks 98 and 99 and bearing blocks 103 and 104 are slidable in the slots 100 and 101, and a spring 105 acts on the bearing block 98 and a spring 106 acts on the bearing block 99 to force the bearing blocks 98 and 99 toward the bearing blocks 103 and 104 respectively whereby the peripheries of the rollers 95 and 96 are normally urged toward each other. Adjustment bolts 107 and 108 respectively cooperate with the springs 105 and 106 so that the pressure exerted by the springs may be adjusted to regulate the pressure exerted by the rollers 95 and 96 on pasted grids passing therebetween.

When the leading edges of the pasted grids G slide down the cam plates 94 (Fig. 3), the leading ends thereof pass to the bight between the rollers 95 and 96 and the trailing edges thereof ride on the belt 33 as it passes about the pulley 32. The belt 33 is so spaced from the bight between the rollers 95 and 96 that the trailing edge of the grid does not disengage the belt 33 until the leading marginal edge thereof is clamped in the bight between the rollers 95 and 96 and therefore the grid assumes an angular position between the cam plates 94 and by reason of the angular extent of the grids relative to the belt 33, the belt forces the grids into the bight of the rollers 95 and 96. As the grid moves into such an angular position any paste adhering to the trailing edge of the grid is broken therefrom and falls into the receptacle 87.

A chain 109 (Fig. 1) passes about the sprocket 110 fast on the shaft 31 and about a sprocket 111 (Fig. 7) fast on the shaft 102 and preferably the sprocket 111 is smaller than the sprocket 110 so that the roller 96 and therefore the roller 95 will be driven at a higher rate of speed than the belt 33 so that a grid in the bight of the rollers 95 and 96 is fed past these rollers at a higher rate of speed than that at which the grids are fed by the belt 33 so that a leading grid will have passed from the rollers 95 and 96 prior to the time the leading edge of the subsequent grid approaches the bight between these rollers.

It is important that the pasted grids have a large surface area and to this end the finishing rollers 95 and 96 roughen the pasted surfaces of the grids as the grids pass therebetween. Consequently the thin fabric coverings are provided on the rollers 95 and 96 and preferably foraminated fabric is used so that the paste can enter the interstices and be roughened.

A table 112 is provided near the extensions 16 and the operator of the machine may stack a supply of grids thereon and from time to time these grids are stacked on the extensions 16 for passage through the machine. The shoulder 20 engages the rear edge of the lowermost grid and forces this grid forwardly in the manner described and preferably the operation of the roller 18 is so timed that the shoulder 20 will feed the grids forwardly in adjacent relation to each other. The grids are picked up by the belt 33 upon disengagement of the shoulder 20 therefrom and are thereafter fed by the belt until they reach the finishing rollers 95 and 96. Inasmuch as power is supplied to the roller 18 through the belt 33 any failure in operation of the belt 33 will also interrupt operation of the roller 18 and therefore jamming of the grids during passage thereof through the hopper is prevented.

Preferably paste is not applied to the marginal side edges and the lugs of the grids and therefore the opening in the bottom of the hopper is sized to correspond to the width of the grids intermediate the marginal side edges thereof. To insure against the application of paste to the marginal side edges and the lugs of the grids, the lower parts of the side walls of the hopper 14 are provided with the outwardly extending flanges 13 (Fig. 4) in which longitudinally extending recesses 114 are formed and the marginal side edges and lugs on the grids pass through these recesses 114 during movement thereof through the hopper. Furthermore, since no paste is applied to the marginal side edges and lugs of the grids, the rollers 95 and 96 (Fig. 7) are of a length corresponding to the width of the opening at the bottom of the hopper 14 so that they will be effective only on those portions of the grids to which paste has been applied during movement of the grids through the hopper.

The pressure of the finishing rollers 95 and 96 on the grids passing therebetween squeezes excess moisture from the pasted grids as they pass between these rollers and moisture so removed from the pasted grids collects in a receptacle 115 mounted in the frame 10 adjacent the receptacle 87.

Pasted grids may check which is objectionable and may so dry out that the paste will not be properly secured therein but checking and excessive drying out may be obviated by immersing the pasted grids in a fixing bath such as a suitable acid, for example, sulphuric. Furthermore the pasted grids may be rendered durable by immersing them in a fixing bath. Therefore, as the grids pass from the finishing rollers 95 and 96 I automatically immerse the grids in a fixing bath and subsequently deposit the grids on a delivery conveyor.

A lined tank 116 is mounted on the frame 10 forwardly of the finishing rollers 95 and 96 and the pasted grids are passed through the bath in this tank and in those instances where the bath is acid the tank is lined as indicated at 117 with an acid resistant material such as lead. As the grids pass from the finishing rollers 95 and 96 the lugs L thereon ride along the substantially horizontal surfaces on the cam plates 118 carried by the brackets 119 fast at the sides of the tank 116. A receptacle 120 is removably retained on the top of the tank 116 adjacent the forward end of the horizontal surfaces on the cam plates 118 by thumb screws 121. A stop 122 including an upturned end facing the horizontal surfaces on the cam plates 118 is mounted on the receptacle 120, and this stop is preferably made of a resilient material such as rubber.

The leading edge of the pasted grids fed over the horizontal surfaces of the cam plates 118 engage the upturned end of the stop 122 and about the time the leading edges of the grids engage the stop the trailing edges thereof ride along with the roller 96 to assume an inclined position such as that shown in broken lines in Fig. 3 and as the grids move into this inclined position the leading edges thereof are forced against the inclined part of the stop 122 and move thereover to thereby remove any paste adhering to the leading edges of the grids and the removed paste falls into the receptacle 120 to be collected therein.

The receptacle 120 includes a rolled edge 123 (Fig. 3) disposed adjacent the stop 122 and when the roller 96 so advances that the trailing edges of the grids are disengaged therefrom the grids pivot on this rolled edge 123 into substantially vertical position and then the lugs thereon slide down the curved cam surfaces 124 on the cam plates 118.

A shaft 125 (Fig. 8) is journaled in the tank 116 and carries a pair of discs 126. The lower ends of the cam surfaces 124 extend past the peripheries of the discs 126 outwardly of the discs and spaced teeth 127 on the discs have radially extending edges thereon on the sides thereof facing in the direction of rotation of the discs which is clockwise as viewed in Fig. 8. As the grids G slide down the cam surfaces 124 they move into engagement with the discs 126 and the lugs L thereon are picked up by the teeth 127.

As the pasted grids slide down the cam surfaces 124 they are immersed in the bath in the tank 116 and are retracted therefrom as the discs 126 rotate.

Another pair of cam plates 128 are mounted on the tank 116 outwardly of the discs 126 and these cam plates terminate adjacent the vertical center plane of the shaft 125 and a grid picked up by the teeth 127 is carried up into vertical position, and as the teeth 127 carrying the grid move beyond the vertical center plane of the shaft 125 the lugs L on the carried grid are deposited on the cam plates 128 over which they slide toward another pair of discs 129 similar to the discs 126.

Figures 1, 2, 2A:
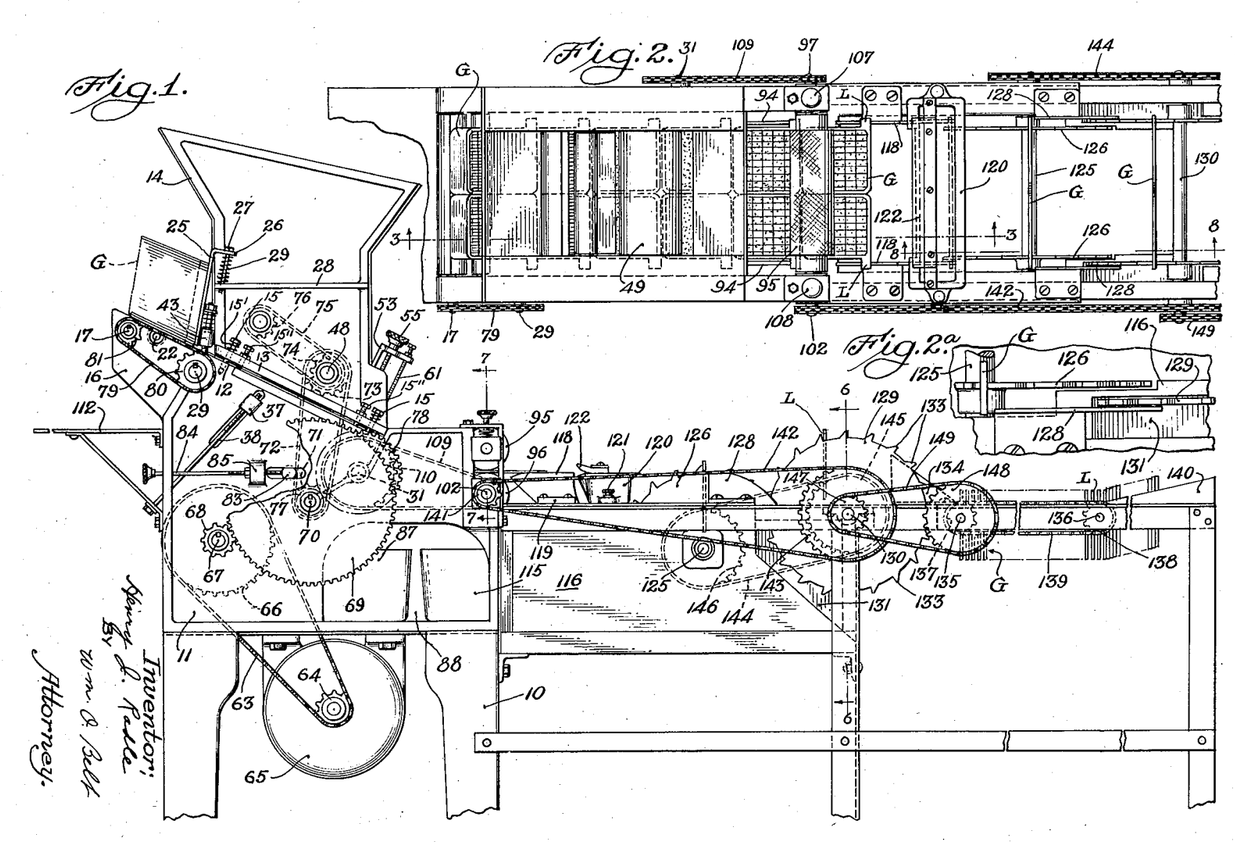
Fig. 1 is a side elevation.
Fig. 2 is a top plan.
Fig. 2a is an enlarged fragmentary detail view.
Figure 8:
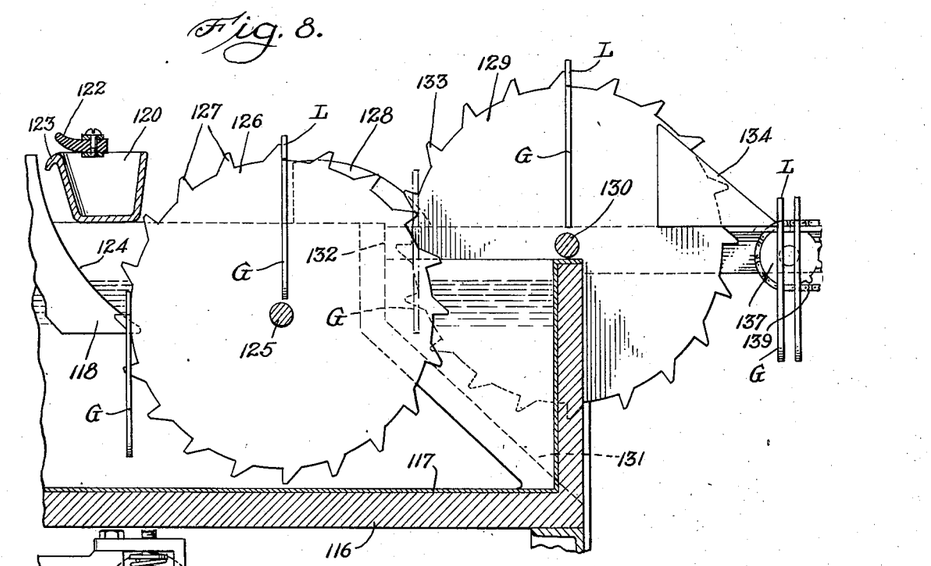
Fig. 8 is a longitudinal sectional view taken substantially on the line 8—8 on Fig. 2.

A shaft 130 is journaled in the frame 10 substantially in alignment with the forwardmost wall of the tank 116 and the discs 129 are fast on this shaft. As best illustrated in Figs. 2a and 8 recesses 131 are formed in the outer wall of the tank by offsets 132 and the discs 129 extend into these recesses. The discs 129 are arranged inwardly of the cam plates 128 and as the lugs L on the grids slide along these recesses they move onto teeth 133 on the peripheries of the discs 129 to be picked up and carried by these teeth and the grids are carried along by the teeth to be deposited on the cam plates 134 mounted on the frame 10 inwardly of the discs 129.

Shafts 135 and 136 (Fig. 1) are journaled in the frame 10 in spaced relation with each other. Sprockets 137 are mounted on the shaft 135 inwardly of the lower ends of the cam plate 134 and sprockets 138 are mounted on the shaft 136 in alignment with the sprockets 137. Chains 139 are directed around the aligned sprockets 137 and 138 and grids G pass from the cam plates 134 to have the lugs L thereon slide onto the chains 139, and the grids picked up by the chains are carried along in spaced relation to a pair of cam plates 140 mounted beyond the shaft 136 and the grids pass from the chains 139 onto the cam plates 140 and the engagement of the succeeding grids with the preceding grids forces the grids in compact relation up the cam plates 140. By passing the grids up the cam plates 140 they are packed in close face to face relation which facilitates their removal from the machine.

The discs 126 and 129 and the chains 139 preferably operate in timed relation with the other parts of the machine and therefore a sprocket 141 is fast on the shaft 102 and a chain 142 is directed thereabout which also passes about a sprocket 143 on the shaft 130. A chain 144 passes about a sprocket 145 on the shaft 130 and a sprocket 146 on the shaft 125. The sprocket 143 is larger than the sprocket 141 so that the shaft 130 is rotated at a slower rate of speed than the shaft 102 but the sprockets 145 and 146 are preferably of the same size so that the shafts 130 and 125 will operate at the same speed. A small sprocket 147 is fast on the shaft 130 outwardly of the sprocket 143 and a larger sprocket 148 is fast on the shaft 135. A chain 149 passes about the sprockets 147 and 148 and by reason of the difference in diameter of these two sprockets the chains 139 operate at a relatively low rate of speed.

Figure 9:
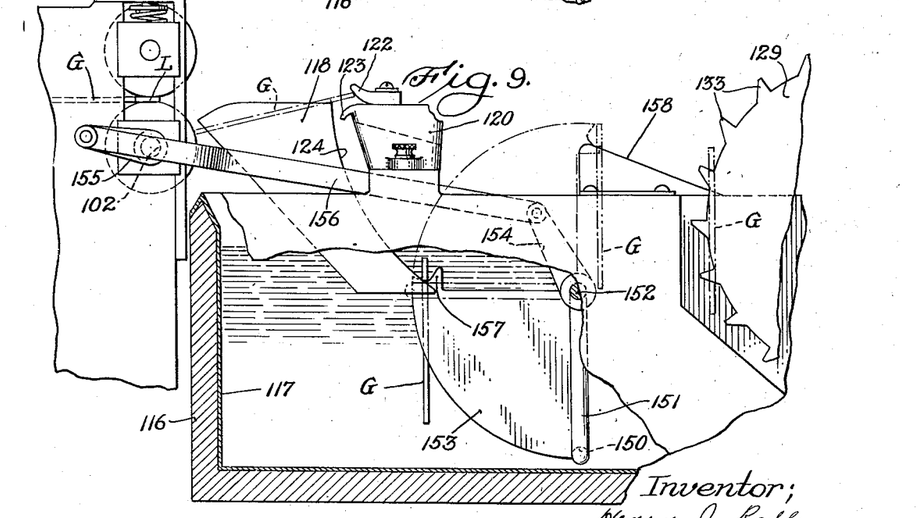
Fig. 9 is a view similar to Fig. 8 showing a modified form of construction.

In the form of the invention shown in Fig. 8 it is necessary to pass the shaft 125 through the walls of the tank 116 to enable the connection of the driving means thereto, but since this shaft must be below the level of the acid bath in the tank 116 this may be disadvantageous and therefore I provide the arrangement shown in Fig. 9. A rocker 150 includes upstanding limbs 151 having outwardly extending studs 152 at the upper ends thereof. The studs 152 are journaled in the side walls of the tank 116 but do not extend therethrough. Quadrants 153 are mounted on the rocker 150 to be positioned outwardly of the lower ends of the surfaces 124 on the cam plates 118. An arm 154 is fast on one of the studs 152 of the rocker 150 and an arm 155 is fast on the shaft 102 at the place whereat the sprocket 141 is fast in Fig. 7. A link 156 interconnects the arms 154 and 155 and as the shaft 102 rotates, the arm and link structure oscillate the quadrants 153 between the full and broken line positions of Fig. 9. At the time a grid is passing down the cam surfaces 124 the teeth 157 on the quadrants 153 are positioned adjacent the lower ends of the cam surfaces 124 and receive the lugs L. Subsequently the rocker 150 is swung to move the teeth into the broken line position of Fig. 9 whereupon the grid carried by the teeth 157 is dropped onto the top surfaces of cam plates 158 mounted on the sides of the tank 116, and the cam surfaces 158 like the cam surfaces 128 guide the plates to the teeth 133 on the discs 129 and subsequently the grids are passed to the conveyor chains 139 in the manner previously described.

It is manifest from the foregoing description that I have provided a machine through which grids for storage batteries and the like may be passed to have paste or like material packed thereinto. The machine is entirely automatic in operation and removes the grids from a group thereof stacked in the machine and passes them in adjacent relation through the machine. The marginal side edges and lugs of the grids are covered while passing through pasting position in the machine to prevent the application of paste thereto. However, an adequate quantity of paste is applied to those portions of the grids where it is adapted to be applied and excess paste is removed from the grids prior to their passage from the hopper to avoid wasting the paste.

The paste is stripped from the means which press it into the openings in the grids as the grids pass from the pressing means and I avoid pulling the paste from the openings in the grids upon disengagement of the grids from the carrier that moves the grids through the hopper by employing a heavy fabric carrier and maintaining a predetermined degree of saturation in this carrier, and easily adjustable means are provided in the machine to enable the proper degree of saturation to be maintained in the carrier.

The paste is firmly pressed onto the grids to insure uniformity therein and the pasted surfaces of the grids are roughened to increase the surface area thereof and the durability of the pasted grids, and checking thereof is prevented by passing the grids through a fixing bath prior to discharging them from the machine.

While I have illustrated and described selected embodiments of my invention it is to be understood that these are capable of variation and modification and I therefore do not wish to be limited to the precise details set forth but desire to avail myself of such changes and alterations as fall within the scope of the following claims.

I claim:

1. In a battery grid pasting machine, a hopper for the paste, means for advancing the grids through the lower part of the hopper, a roller in the hopper for feeding the paste onto the grids, means for separating the paste from the roller and acting to urge the paste onto the grids as the grids are moved away from the roller by the advancing means, means for scraping excess paste from the grids prior to passage thereof from the hopper, and means for packing the paste into the grids after movement thereof past the scraping means.

2. In a battery grid pasting machine, a hopper for the paste, means for advancing the grids through the lower part of the hopper, a roller in the hopper for feeding the paste onto the grids, means for separating the paste from the roller and acting to urge the paste onto the grids as the grids are moved away from the roller by the advancing means, common means for scraping excess paste from the grids prior to passage thereof from the hopper and for packing the paste into the grids, and adjusting means cooperating with the common means and operable to adjust independently the scraping and packing portions of said common means.

3. In a battery grid pasting machine, a hopper for the paste, a pair of pulleys mounted below the hopper and having an endless belt directed thereabout and so positioned that the upper reach of said belt provides a bottom for the hopper, a supporting means below the upper reach of the belt intermediate said pulleys, means for feeding grids one at a time onto the upper reach of the belt to be movable therewith, means in the hopper for feeding paste onto the grids on the belt, means for operating the belt, and a roller cooperating with one of the pulleys and spaced from said pulley to receive the lower reach of the belt therebetween, said roller applying pressure on the belt to squeeze moisture from the belt and maintain a predetermined degree of saturation therein to prevent the belt from pulling paste from the grids when the grids are separated therefrom.

4. In a battery grid pasting machine, a hopper for the paste, a pair of pulleys mounted below the hopper and having an endless belt directed thereabout and so positioned that the upper reach of said belt provides a bottom for the hopper, a supporting means below the upper reach of the belt intermediate said pulleys, means for feeding grids one at a time onto the upper reach of the belt to be movable therewith, means in the hopper for feeding paste onto the grids on the belt, means for operating the belt, a roller cooperating with one of the pulleys and spaced from said pulley to receive the lower reach of the belt therebetween, said roller applying pressure on the belt to squeeze moisture from the belt and maintain a predetermined degree of saturation therein to prevent the belt from pulling paste from the grids when the grids are separated therefrom, and means for adjusting said roller relative to said pulley to regulate the pressure applied by said roller on said belt.

5. In a battery grid pasting machine, a hopper for the paste, a pair of pulleys mounted below the hopper and having an endless belt directed thereabout and so positioned that the upper reach of said belt provides a bottom for the hopper, a supporting means below the upper reach of the belt intermediate said pulleys, means for feeding grids one at a time onto the upper reach of the belt to be movable therewith, means in the hopper for feeding paste onto the grids on the belt, means for operating the belt, a roller cooperating with one of the pulleys and spaced from said pulley to receive the lower reach of the belt therebetween, said roller applying pressure on the belt to squeeze moisture from the belt and maintain a predetermined degree of saturation therein to prevent the belt from pulling paste from the grids when the grids are separated therefrom, means for removing paste from said belt after the grids are separated therefrom, and means for scraping said roller to remove paste collected thereon.

6. In a battery grid pasting machine, means for applying paste to the grids, means for advancing the grids past the paste applying means, a pair of rollers for applying a finish to the pasted grids and for feeding the grids forwardly, and a stop engageable with the leading edges of the grids prior to disengagement thereof from the rollers to remove paste from the leading edges of the grids.

7. A pasting machine, a hopper having an inlet and an outlet, the bottom of said hopper sloping downwardly from said inlet to said outlet, primary pasting means in said hopper near the inlet thereof, and pressure means in said hopper more remote from said inlet.

8. A pasting machine, a hopper having an inlet and an outlet, a movable belt constituting the bottom of said hopper and sloping downwardly from said inlet to said outlet, primary pasting means in said hopper near the inlet thereof, and pressure means in said hopper more remote from said inlet.

9. In a pasting machine, a hopper, means for conveying grids through said hopper, agitating and pasting means in said hopper, a pressure roller in said hopper spaced from said means in the direction of grid travel, the bottom of said hopper sloping downwardly from said means toward said roller, and a scraper engaging said roller where it breaks contact with the grid, said scraper extending into close proximity to the upper surface of the grid passing therebeneath, whereby it functions as a dam on the material in the hopper between said means and said roller.

10. In a pasting machine, a hopper, means for conveying grids through said hopper, agitating and pasting means in said hopper, a pressure roller in said hopper spaced from said means in the direction of grid travel, a movable belt constituting the bottom of said hopper and sloping downwardly from said means towards said roller, and a scraper engaging said roller where it breaks contact with the grid, said scraper extending into close proximity to the upper surface of the grid passing therebeneath, whereby it functions as a dam on the material in the hopper between said means and said roller.

HENRY J. RADLE.